US008455150B2

(12) United States Patent
Rohwer (10) Patent No.: US 8,455,150 B2
(45) Date of Patent: Jun. 4, 2013

(54) FUEL CELL STACK HAVING REACTANT CARRIER PLATES DELIVERING BOTH ANODE AND CATHODE REACTANTS

(75) Inventor: Thorsten Rohwer, Trebur (DE)

(73) Assignee: GM Global Technology Operations LLC, Detroit, MI (US)

( * ) Notice: Subject to any disclaimer, the term of this patent is extended or adjusted under 35 U.S.C. 154(b) by 237 days.

(21) Appl. No.: 12/841,296

(22) Filed: Jul. 22, 2010

(65) Prior Publication Data

US 2010/0285385 A1 Nov. 11, 2010

Related U.S. Application Data

(62) Division of application No. 11/106,305, filed on Apr. 14, 2005, now Pat. No. 7,803,475.

(51) Int. Cl.
*H01M 8/24* (2006.01)
*H01M 2/38* (2006.01)

(52) U.S. Cl.
USPC ............ 429/471; 429/467; 429/456; 429/457

(58) Field of Classification Search
USPC ................. 429/471, 467, 468, 469, 470, 454, 429/452, 456, 457
See application file for complete search history.

(56) References Cited

U.S. PATENT DOCUMENTS

| 5,952,118 | A | 9/1999 | Ledjeff et al. |
| 2004/0018412 | A1* | 1/2004 | Orsbon et al. ................. 429/37 |
| 2004/0038109 | A1 | 2/2004 | Bernacki |
| 2004/0115513 | A1* | 6/2004 | Yang .............................. 429/38 |
| 2004/0170883 | A1 | 9/2004 | Bartholomeyzik et al. |
| 2004/0209147 | A1* | 10/2004 | Finkenwirth et al. ........... 429/35 |
| 2006/0096456 | A1 | 5/2006 | Schroeter |

FOREIGN PATENT DOCUMENTS

| DE | 10243163 A1 | 5/2003 |
| JP | 2002042838 A | 2/2002 |

OTHER PUBLICATIONS

Lee, et al.; "Design and Fabrication of a Micro Fuel Cell Array with 'Flip-Flop' Interconnection"; Journal of Power Sources 112 (2002); pp. 410-418.
C. Hebling; "Technology and Markets of Micro Fuel Cell Systems"; undated (2 pages).

* cited by examiner

*Primary Examiner* — Raymond Alejandro
(74) *Attorney, Agent, or Firm* — Quinn Law Group, PLLC (57) ABSTRACT

A fuel cell stack includes a plurality of adjacently stacked fuel cell modules each of which includes a plurality of adjacently aligned fuel cells that are connected in electrical series. The current flow between adjacent fuel cells is achieved across diffusion media of said adjacent fuel cells. First and second reactant channels are formed in the reactant carrier plates for separately delivering two different reactants along each reactant carrier plate.

6 Claims, 10 Drawing Sheets

FUEL CELL STACK HAVING REACTANT CARRIER PLATES DELIVERING BOTH ANODE AND CATHODE REACTANTS

CROSS-REFERENCE TO RELATED APPLICATIONS

This application is a divisional of U.S. patent application Ser. No. 11/106,305 filed on Apr. 14, 2005, now U.S. Pat. No. 7,803,475, issued Sep. 28, 2010. The entire disclosure of the above application is incorporated herein by reference.

FIELD OF THE INVENTION

The present invention relates to fuel cell stacks, and more particularly to current conduction through a fuel cell stack.

BACKGROUND OF THE INVENTION

Fuel cell systems are increasingly used as a power source in a wide variety of applications. Fuel cell propulsion systems have also been proposed for use in vehicles as a replacement for internal combustion engines. The fuel cells generate electricity that is used to charge batteries and/or to power an electric motor. A solid-polymer-electrolyte fuel cell includes a membrane that is sandwiched between an anode and a cathode, referred to as an MEA or membrane electrode assembly. MEA's are sandwiched between conductive separator plates. To produce electricity through an electrochemical reaction, a fuel, commonly hydrogen ($H_2$), but also either methane ($CH_4$) or methanol ($CH_3OH$), is supplied to the anode and an oxidant, such as oxygen ($O_2$) is supplied to the cathode. The source of the oxygen is commonly air.

One characteristic of PEM fuel cells is that power is often provided at a higher current and a lower voltage than is required by the loads they are connected to. As a result, a power conversion device is incorporated between the load and the fuel cell stack to step up the voltage supplied to the load. Such power conversion devices increase cost, weight and volume of the fuel cell system.

SUMMARY OF THE INVENTION

Accordingly, the present invention provides a fuel cell stack including a plurality of adjacently stacked fuel cell modules each of which includes a plurality of adjacently aligned fuel cells that are connected in electrical series. The current flow between adjacent fuel cells is achieved across diffusion media of said adjacent fuel cells.

In another feature, the fuel cell stack further includes a seal disposed between and along a portion of adjacently aligned fuel cells. The seal is fluid impermeable and electrically non-conductive.

In another feature, the fuel cell stack further includes a seal disposed between and along a portion of adjacently aligned fuel cells. The seal is fluid impermeable and electrically conductive.

In still another feature, the fuel cell modules are connected in electrical parallel.

In yet another feature, the fuel cell modules are connected in electrical series.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
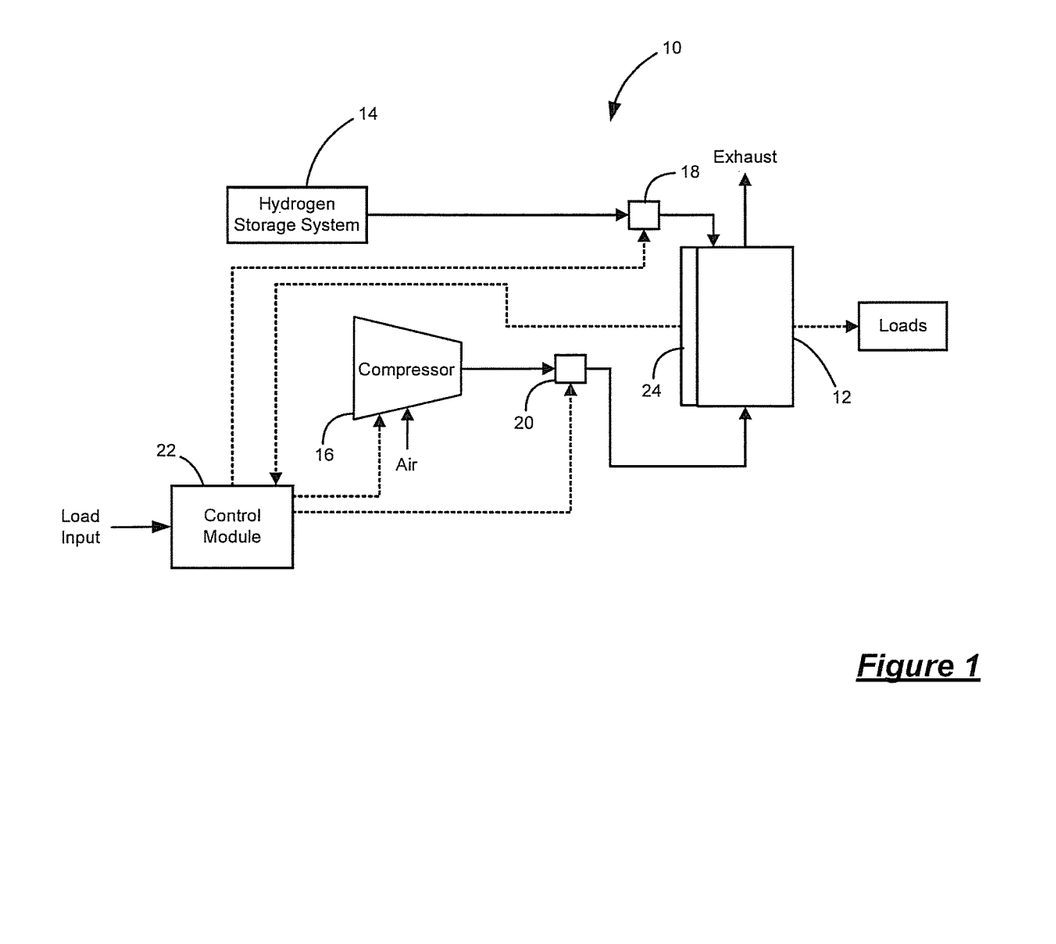
FIG. 1 is a schematic illustration of an exemplary fuel cell system including a fuel cell stack in accordance with the present invention.

Referring now to FIG. 1, an exemplary fuel cell system 10 is illustrated. The fuel cell system 10 includes a fuel cell stack 12, a hydrogen storage system 14 and a compressor 16. The hydrogen storage system 14 includes a regulator system 18, which regulates a hydrogen flow to an anode side of the fuel cell stack 12. The compressor 16 provides pressurized, oxygen-rich air to a cathode side of the fuel cell stack 12 through a regulator 20. Reactions between the hydrogen and oxygen within the fuel cell stack 12 generate electrical energy that is used to drive a load (not shown). A control module 22 regulates overall operation of the fuel cell system 10. Measuring electronics 24 monitor characteristics (e.g., voltage, current) of the fuel cells of the fuel cell stack 12 and communicate corresponding signals to the control module 22. The control module 22 regulates operation of the fuel cell system based on a load input and the signals generated by the measuring electronics 24 of the fuel cell system 10. The load input indicates the desired electrical energy output from the fuel cell stack 12. For example, in the case of a vehicle, the load input could include a throttle.

Figure 2:
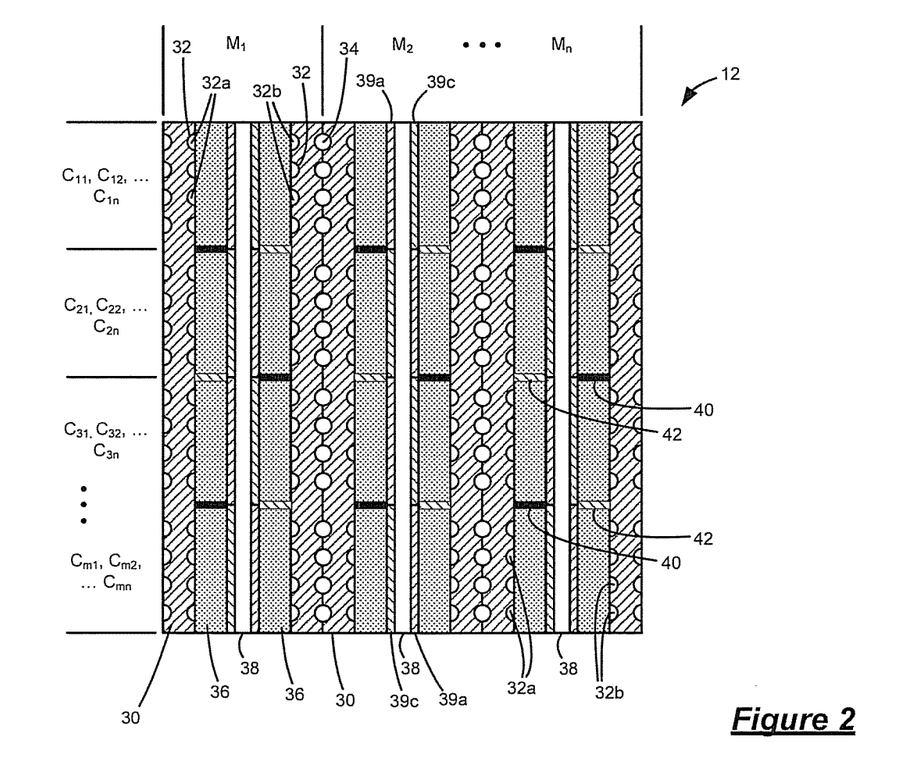
FIG. 2 is a schematic cross-sectional view of a portion of the fuel cell stack.

Referring now to FIG. 2, a cross-section of a portion of the fuel cell stack 12 is illustrated. The fuel cell stack 12 includes a plurality of fuel cell modules ($M_1, M_2, \ldots, M_n$) that each include a plurality of fuel cells ($C_{11}, \ldots, C_{m1}; C_{12}, \ldots, C_{m2}; C_{1n}, \ldots, C_{mn}$). More specifically, each fuel cell module includes insulated end plates (IEPs) 30, between which, the plurality of fuel cells are defined. The IEPs 30 include reactant channels 32 formed therein and can include heat transfer channels 34 formed on a side opposite to the side that includes the reactant channels 32. Reactants (e.g., anode and cathode reactants) are distributed across the fuel cell modules through the reactant channels 32, as described in further detail below. A heat transfer medium flows through the heat transfer channels 34 to regulate the temperature of the fuel cell stack 12.

Each fuel cell includes first reactant channels 32a, second reactant channels 32b, diffusion media 36 and a polymer exchange membrane (PEM) 38 and anode and cathode catalyst layers 39a,39c, respectively. The PEM 38 and the anode and cathode catalyst layers 39a,39c define a membrane electrode assembly (MEA). The first and second reactant channels 32a,32b are formed in the IEPs 30. Two adjacently stacked IEPs 30 define a bipolar plate. The IEPs 30 are electrically non-conductive and are thermally conductive. In this manner, heat can be transferred between the fuel cell modules and a heat transfer medium flowing through the heat transfer channels.

Adjacent fuel cells are separated from one another within the fuel cell modules by a first seal 40 and a second seal 42. The first and second seals 40,42 are gas seals that inhibit reactant seepage between adjacent fuel cells. The first seal 40 is electrically non-conductive and the second seal 42 is electrically conductive to define a current flow through the fuel cell module, as discussed in further detail below.

Figure 3:
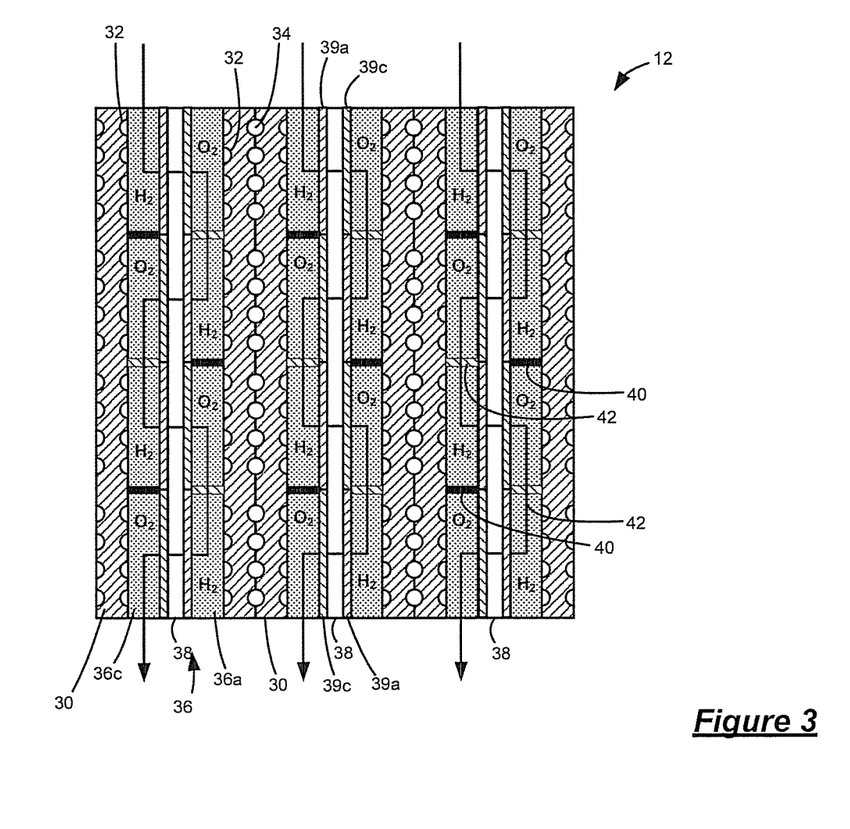
FIG. 3 is the schematic cross-section of FIG. 2 illustrating current flow through modules of the fuel cell stack.
Figure 4:
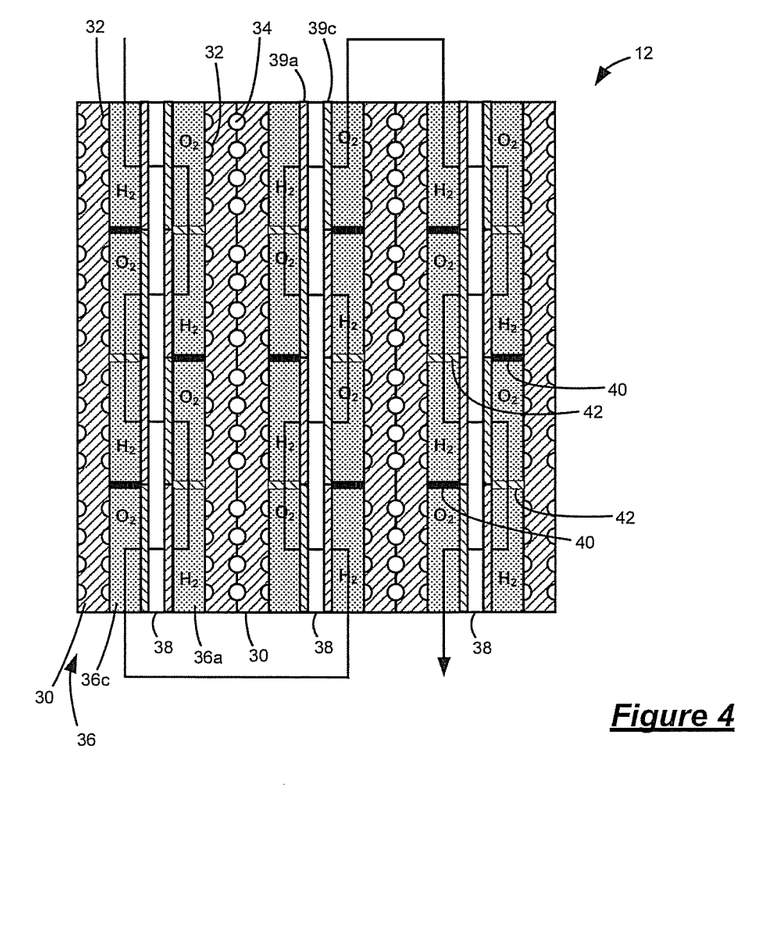
FIG. 4 is a schematic cross-section of the fuel cell stack illustrating the modules connected in electrical parallel.

Referring now to FIG. 3, the fuel cells within each module are connected in electrical series. More specifically, the diffusion media 36 are electrically conductive to define current flow across the fuel cell module. A cathode ($O_2$) diffusion media 36c is in electrical communication with an anode ($H_2$) diffusion media 36a of an adjacent fuel cell through the second seal 42. In this manner, current flow across the individual fuel cells from anode to cathode sides continues flowing from cathode diffusion media 36c to adjacent anode diffusion media 36a between the fuel cells. It is anticipated that the modules can be connected in electrical parallel or electrical series (see FIG. 4).

Figure 5:
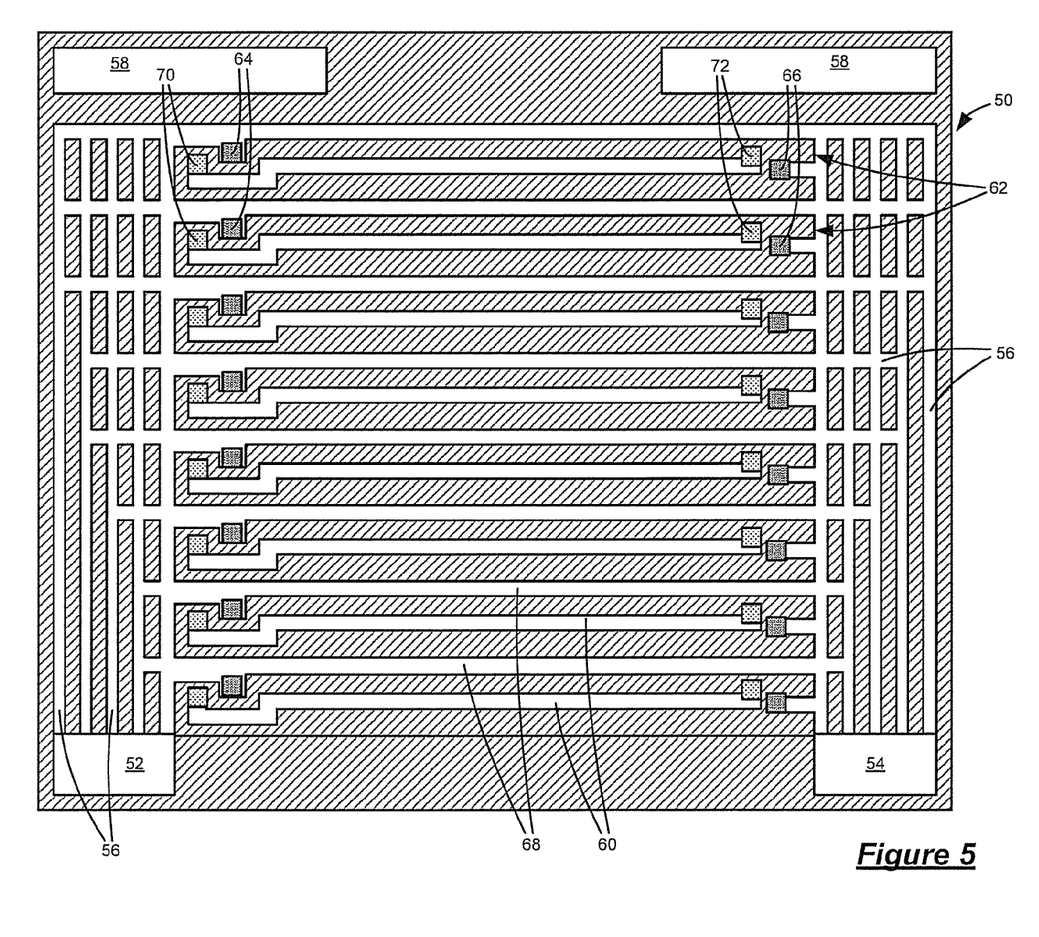
FIG. 5 is a plan view of an exemplary first reactant distribution layer of the fuel cell stack.

Referring now to FIGS. 5 through 9, exemplary layers of a fuel cell module will be discussed in detail. The exemplary layers define a multi-dimensional reactant flow for both the anode and cathode reactants through the multiple fuel cells within the fuel cell module. With particular reference to FIG. 5, a first reactant (i.e., anode or cathode) carrier plate 50 is illustrated and includes first reactant inlet and outlet headers 52,54 that are in fluid communication with distribution channels 56 and second reactant headers 58 formed therethrough. The first reactant inlet and outlet headers 52,54 are in fluid communication with a first reactant source and the second reactant headers are in fluid communication with a second reactant source.

The distribution channels 56 distribute a flow of the first reactant to a planar flow field defined by a plurality of planar channels 60. The planar channels are defined between a plurality of second reactant flow sections 62, discussed in further detail below. Although a single planar channel 60 is illustrated between adjacent second reactant flow sections 62, it is anticipated that a plurality of planar channels 60 can be formed between adjacent second reactant flow sections 62. A plurality of first reactant outlets 64 are provided and enable fluid communication to a second reactant (i.e., the other of anode and cathode) carrier plate discussed in further detail below with respect to FIG. 9. More specifically, the first reactant outlets 64 corresponds to first reactant passages of the other module layers to enable fluid communication path across the fuel cell module. A plurality of corresponding first reactant inlets 66 are also provided to enable first reactant flow to return to the first reactant carrier plate 50 from across the fuel cell module.

Each second reactant flow section 62 includes at least one planar channel 68, a second reactant inlet 70 and a second reactant outlet 72. A second reactant flow enters the second reactant flow section 62 through the second reactant inlet 70. The second reactant flow is provided from the second reactant carrier plate from across the fuel cell module. The second reactant flow exits the second reactant flow section 62 through the outlet 72 and returns to the second reactant carrier plate. Although a single planar channel 68 is illustrated within each second reactant flow section, it is anticipated that a plurality of planar channels 68 can be formed within each second reactant flow section 62.

Figure 6:
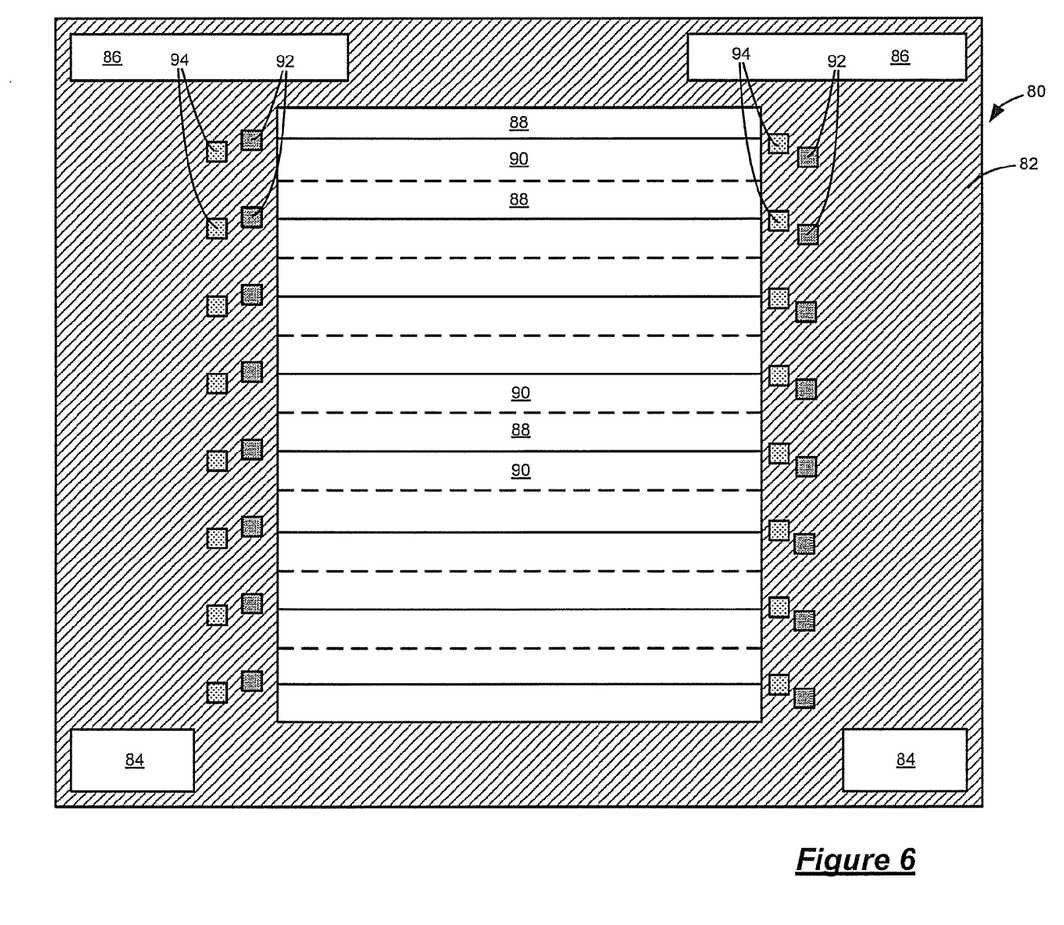
FIG. 6 is a plan view of an exemplary first diffusion media layer of the fuel cell stack.

With particular reference to FIG. 6, a first diffusion media layer 80 of the fuel cell module is illustrated. It is anticipated that the first diffusion media layer 80 can be formed of an electrically non-conductive sheet or foil 82 (e.g., plastic, polymer, etc.). The first diffusion media layer 80 includes first reactant headers 84 and second reactant headers 86 that correspond to the reactant headers of adjacently stacked layers. The first diffusion media layer 80 further includes first reactant diffusion media sections 88 and second reactant diffusion media sections 90 that are carried by the sheet 82. When stacked adjacent to the first reactant carrier plate 50, the first reactant diffusion media sections 88 align with the first reactant planar channels 60 and the second reactant diffusion media sections 90 align with the second reactant planar channels 68. In this manner, the first reactant is able to diffuse through the first reactant diffusion media sections 88 and the second reactant is able to diffuse through the second reactant diffusion media sections 90.

The first diffusion media layer 80 further includes a plurality of first reactant passages 92 and a plurality of second reactant passages 94. The first reactant passages 92 align with the first reactant inlets and outlets 64,66 of the first reactant carrier plate 50 to enable first reactant flow across the fuel cell module. The second reactant passages 94 align with the second reactant inlets and outlets 70 of the first reactant carrier plate 50 to enable second reactant flow across the fuel cell module.

Although each of the first reactant and second reactant diffusion media sections 88,90 are gas sealed from one another, alternating first reactant and second reactant diffusion media sections 88,90 are conductively coupled. As illustrated in FIG. 6, the dashed lines separating adjacent diffusion media sections 88,90 indicate an electrically conductive gas seal and solid lines separating adjacent diffusion media sections 88,90 indicate an electrically non-conductive gas seal. In this manner, electrical current flow is enabled between selective adjacent diffusion media sections 88,90.

Figure 7:
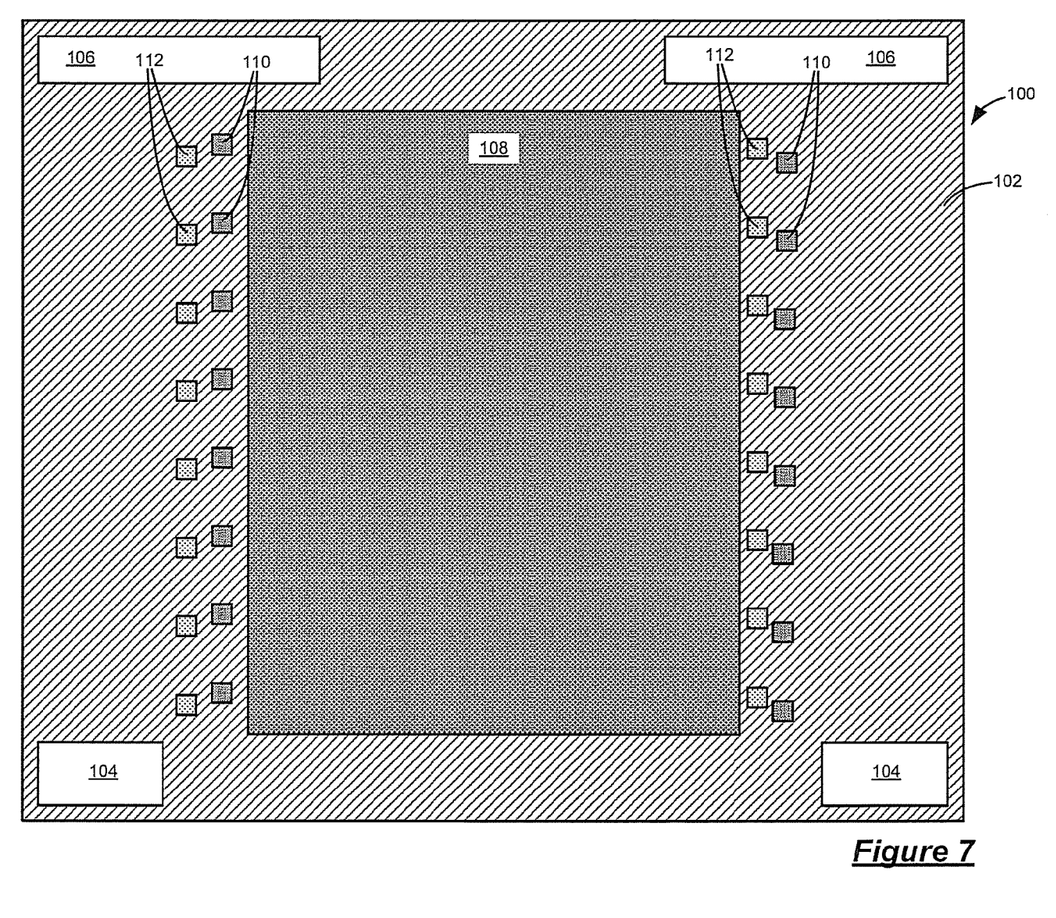
FIG. 7 is a plan view of an exemplary polymer exchange membrane (PEM) layer of the fuel cell stack.

With particular reference to FIG. 7, a membrane electrode assembly (MEA) layer 100 of the fuel cell module is illustrated. It is anticipated that the MEA layer 100 can be formed of an electrically non-conductive sheet or foil 102 (e.g., plastic, polymer, etc.). The MEA layer 100 includes first reactant headers 104 and second reactant headers that correspond to the reactant headers of adjacently stacked layers. The MEA layer 100 further includes an MEA 108 that is carried by the sheet 102. When stacked adjacent to the first diffusion media layer 80, the MEA is aligned across the first and second reactant diffusion media sections 88,90. In this manner, the first and second reactants are able to react across the MEA 108.

The MEA layer 100 further includes a plurality of first reactant passages 110 and a plurality of second reactant passages 112. The first reactant passages 110 align with the first reactant passages 92 of the first diffusion media layer 80 to enable first reactant flow across the fuel cell module. The second reactant passages 112 align with the second reactant passages 94 of the first diffusion media layer 80 to enable second reactant flow across the fuel cell module.

Figure 8:
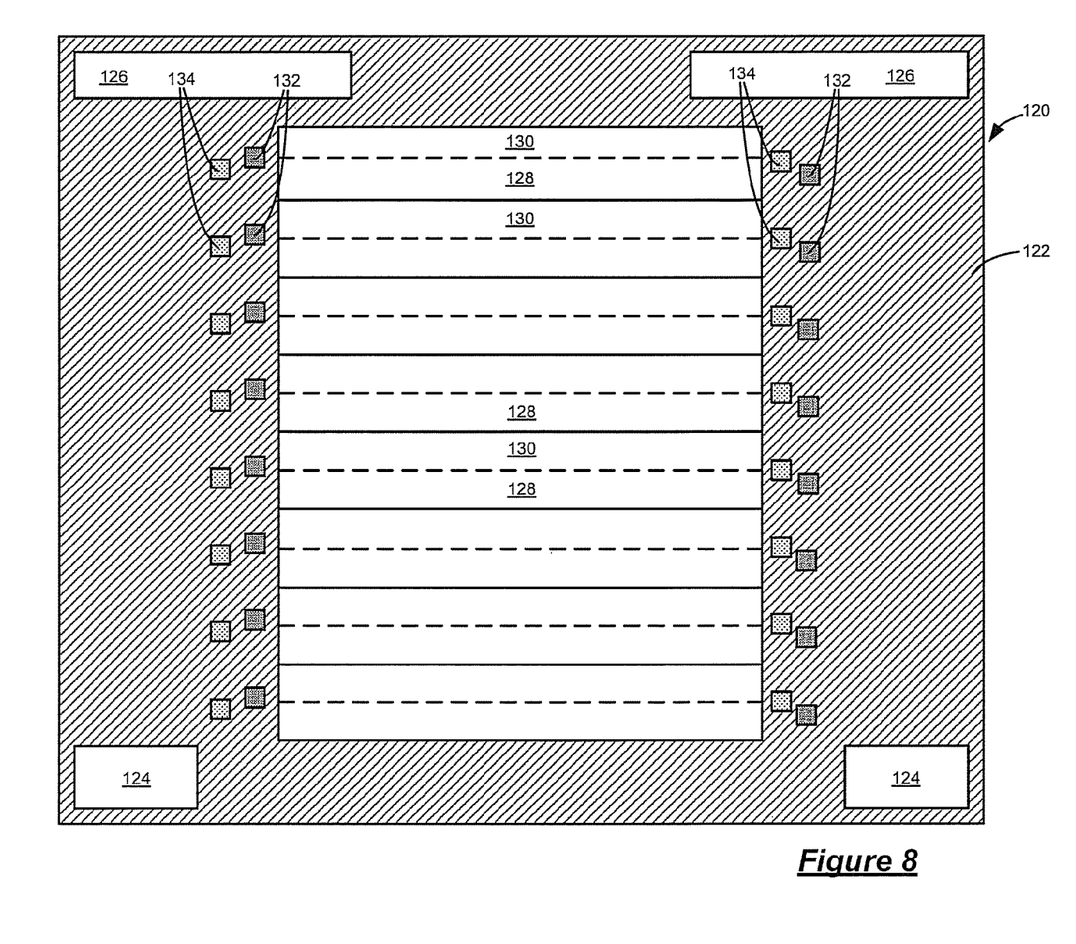
FIG. 8 is a plan view of an exemplary second diffusion media layer of the fuel cell stack.

Referring now to FIG. 8, a second diffusion media layer 120 of the fuel cell module is illustrated. It is anticipated that the second diffusion media layer 120 can be formed of an electrically non-conductive sheet or foil 122 (e.g., plastic, polymer, etc.). The second diffusion media layer 120 includes first reactant headers 124 and second reactant headers 126 that correspond to the reactant headers of adjacently stacked layers. The second diffusion media layer 120 further includes first reactant diffusion media sections 128 and second reactant diffusion media sections 130 that are carried by the sheet. When stacked adjacent to the MEA layer 100, the first reactant diffusion media sections 128 align with the second reactant diffusion media sections 90 of the first diffusion media layer 80 across the MEA layer 100. Similarly, the second reactant diffusion media sections 130 align with the first reactant diffusion media sections 88 of the first diffusion media layer 80 across the MEA layer 100.

The second diffusion media layer 120 further includes a plurality of first reactant passages 132 and a plurality of second reactant passages 134. The first reactant passages 132 align with the first reactant passages 110 of the MEA layer 100 to enable first reactant flow across the fuel cell module. The second reactant passages 134 align with the second reactant passages 112 of the MEA layer to enable second reactant flow across the fuel cell module.

Although each of the first reactant and second reactant diffusion media sections 128,130 are gas sealed from one another, alternating first reactant and second reactant diffusion media sections 128,130 are conductively coupled. As illustrated in FIG. 8, the dashed lines separating adjacent diffusion media sections 128,130 indicate an electrically conductive gas seal and solid lines separating adjacent diffusion media sections 128,130 indicate an electrically non-conductive gas seal. In this manner, electrical current flow is enabled between selective adjacent diffusion media sections 128,130.

Figure 9:
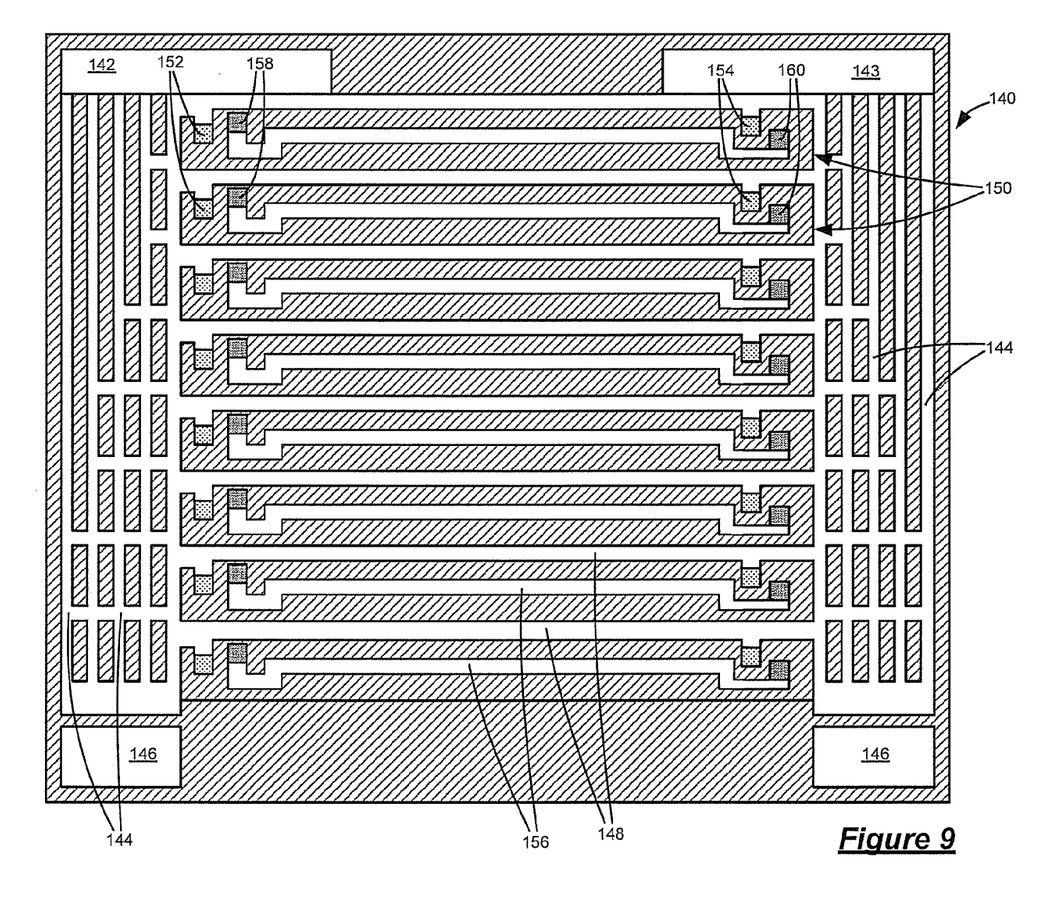
FIG. 9 is a plan view of an exemplary second reactant distribution layer of the fuel cell stack.

With particular reference to FIG. 9, the second reactant (i.e., anode or cathode) carrier plate 140 is illustrated and includes second reactant inlet and outlet headers 142, 143, respectively, that are in fluid communication with distribution channels 144, and first reactant headers 146 formed therethrough. The second reactant headers 146 are in fluid communication with a second reactant source and the first reactant headers are in fluid communication with a first reactant source.

The distribution channels 144 distribute a flow of the second reactant to a planar flow field defined by a plurality of planar channels 148. The planar channels 148 are defined between a plurality of first reactant flow sections 150, discussed in further detail below. Although a single planar channel 148 is illustrated between adjacent first reactant flow sections 150, it is anticipated that a plurality of planar channels 148 can be formed between adjacent first reactant flow sections. A plurality of second reactant outlets 152 are provided and enable fluid communication to the second reactant flow sections 62 of the first reactant carrier plate 50 discussed above. More specifically, the second reactant outlets 152 corresponds to second reactant passages 94,112,134 of the other fuel cell module layers 80,100,120 to enable a fluid communication path across the fuel cell module. A plurality of corresponding second reactant inlets 154 are also provided to enable second reactant flow to return to the second reactant carrier plate 140 from across the fuel cell module.

Each first reactant flow section 150 includes at least one planar channel 156, a first reactant inlet 158 and a first reactant outlet 160. A first reactant flow enters the first reactant flow section 150 through the first reactant inlet 158. The first reactant flow is provided from the first reactant carrier plate 50 from across the fuel cell module. The first reactant flow exits the first reactant flow section 150 through the outlet 160 and returns to the first reactant carrier plate 50. Although a single planar channel 156 is illustrated within each first reactant flow section 150, it is anticipated that a plurality of planar channels 158 can be formed within each first reactant flow section 150.

Figure 10:
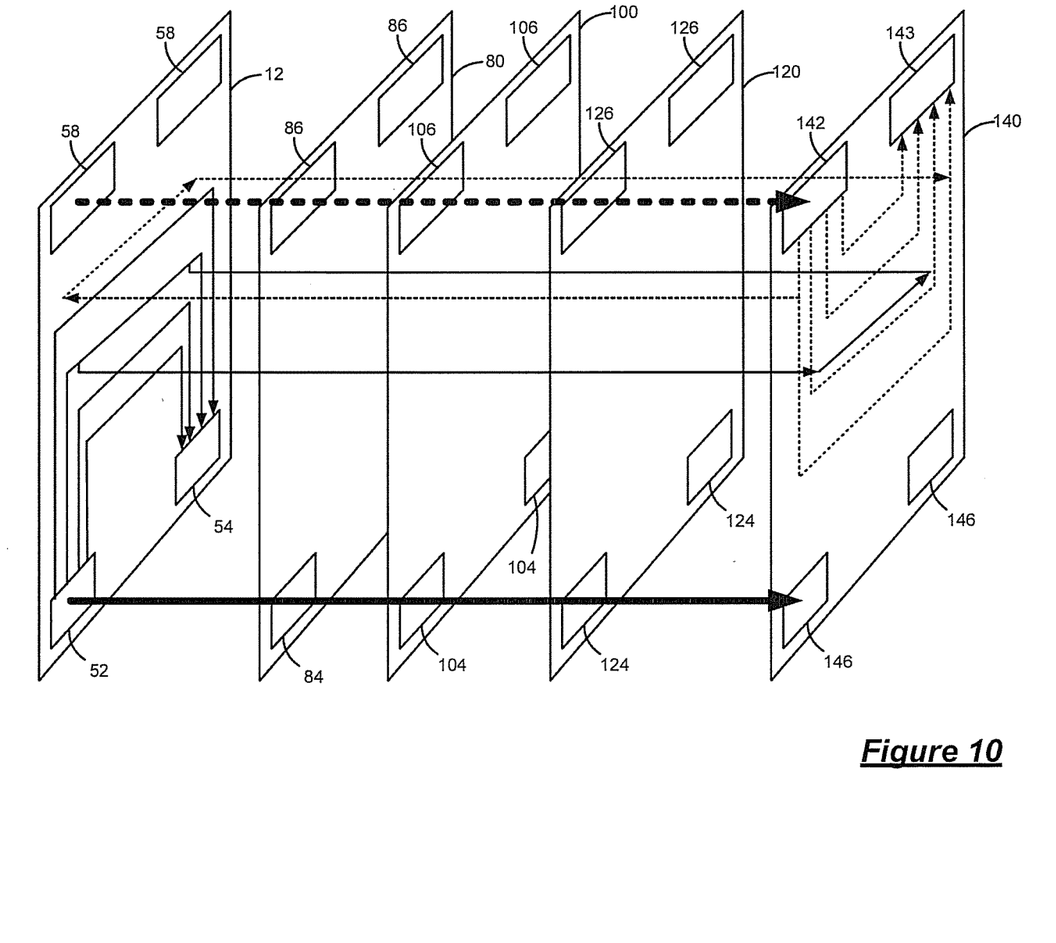
FIG. 10 is a perspective schematic view of the multiple layers of the fuel cell stack illustrating multi-dimensional reactant flow therethrough.

With particular reference to FIG. 10, the multi-dimensional reactant flow across the fuel cell module will be summarized. A first reactant flow enters the first reactant carrier plate 50 through the inlet header 52. The first reactant flow is distributed across the first reactant carrier plate 50 via the distribution channels 56 and the planar channels 60. A portion of the first reactant flow is directed across the multiple layers of the fuel cell module and through the first reactant flow sections 150 of the second reactant carrier plate 140. The detoured portion of the first reactant flow is directed back across the multiple layers of the fuel cell module and the first reactant flow exits the carrier plate 50 through the outlet header 54.

Similarly, a second reactant flow enters the second reactant carrier plate 140 through the inlet header 142. The second reactant flow is distributed across the second reactant carrier plate 140 via the distribution channels 144 and the planar channels 148. A portion of the second reactant flow is directed across the multiple layers of the fuel cell module and through the second reactant flow sections 62 of the first reactant carrier plate 50. The detoured portion of the second reactant flow is directed back across the multiple layers of the fuel cell module and the second reactant flow exits the carrier plate 140 through the outlet header 143.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell stack having a multi-dimensional reactant flow therethrough, comprising:
   a plurality of adjacently stacked fuel cell modules each of which includes a plurality of adjacently aligned fuel cells that are connected in electrical series, each of said plurality of fuel cell modules including:
   a first reactant carrier plate that includes a first plurality of first reactant channels and a first plurality of second reactant channels both on a same side of said first reactant carrier plate;
   intermediate layers including a membrane electrode assembly layer and first and second diffusion media layers; and
   a second reactant carrier plate that includes a second plurality of second reactant channels and a second plurality of first reactant channels both on a same side of said second reactant carrier plate, said first plurality of first reactant channels in fluid communication with said second plurality of first reactant channels across said intermediate layers and said first plurality of second reactant channels in fluid communication with said second plurality of second reactant channels across said intermediate layers, wherein each of said membrane electrode assembly layer and said first and second diffusion media layers include first reactant and second reactant headers extending therethrough that facilitate first and second reactant flows across said fuel cell module.

2. The fuel cell stack of claim 1 wherein said first reactant carrier plate includes a plurality of second reactant flow sections within which, said first plurality of second reactant channels are defined, each of said plurality of second reactant flow sections including an inlet and an outlet to receive and exhaust a second reactant flow from across said fuel cell module.

3. The fuel cell stack of claim 1 wherein said second reactant carrier plate includes a plurality of first reactant flow sections within which, said second plurality of first reactant channels are defined, each of said plurality of first reactant flow sections including an inlet and an outlet to receive and exhaust a first reactant flow from across said fuel cell module.

4. The fuel cell stack of claim 1 further comprising a seal disposed between and along a portion of adjacently aligned fuel cells, said seal being fluid impermeable and electrically non-conductive.

5. The fuel cell stack of claim 1 wherein said fuel cell modules are connected in electrical parallel.

6. The fuel cell stack of claim 1 wherein said fuel cell modules are connected in electrical series.

\* \* \* \* \*